United States Patent [19]

Coffelt et al.

[11] Patent Number: 4,965,795
[45] Date of Patent: Oct. 23, 1990

[54] D CHANNEL MONITOR

[75] Inventors: Steven R. Coffelt; Thomas W. Durston, both of Camarillo, Calif.

[73] Assignee: Harris Corporation, Melbourne, Fla.

[21] Appl. No.: 192,174

[22] Filed: May 10, 1988

[51] Int. Cl.⁵ .............................................. H04J 3/14
[52] U.S. Cl. .................................... 370/110.1; 370/13
[58] Field of Search .................... 370/110.1, 94, 84; 371/5, 11

[56] References Cited

U.S. PATENT DOCUMENTS

| | | | |
|---|---|---|---|
| 4,096,354 | 6/1978 | Bleickard et al. | 370/13 |
| 4,383,312 | 5/1983 | Reed | 370/13 |
| 4,488,289 | 12/1984 | Turner | 370/60 |
| 4,507,782 | 3/1985 | Kunimasa et al. | 371/32 |
| 4,546,467 | 10/1985 | Yamamoto | 370/13 |
| 4,550,403 | 10/1985 | Beynie | 370/110.1 |
| 4,584,680 | 4/1986 | Carter et al. | 370/96 |
| 4,589,106 | 5/1986 | Prather et al. | 370/58 |
| 4,592,047 | 5/1986 | Fundneider | 370/110.1 |
| 4,602,364 | 7/1986 | Herman et al. | 370/85 |
| 4,611,320 | 9/1986 | Southard | 370/13 |
| 4,616,361 | 10/1986 | Strehl | 370/110.1 |
| 4,663,776 | 5/1987 | Wever | 379/29 |
| 4,682,347 | 7/1987 | Lynch | 379/29 |
| 4,730,313 | 3/1988 | Stephenson et al. | 371/5 |
| 4,755,992 | 7/1988 | Albal | 370/110.1 |
| 4,797,875 | 1/1989 | Popischil et al. | 370/110.1 |

Primary Examiner—Douglas W. Olms
Assistant Examiner—Christopher O. Edwards
Attorney, Agent, or Firm—Antonelli, Terry, Stout & Kraus

[57] ABSTRACT

A D channel monitor is provided which is capable of providing a plurality of operating modes for monitoring D channel operation. As such, the D channel monitor can include first and second interface elements which can be operated to appear as either an NT interface (for a TE) or as a TE interface (for an NT). A controller is provided which can control the first and second interface elements to appear as predetermined ones of the NT interface or the TE interface for respectively coupling to either a TE or an NT of the ISDN user terminal. A monitoring arrangement is also included for monitoring the D channel signals at the terminal which are received through either of the first and second interface elements. This monitoring arrangement includes means for indicating the status of the D channel signals to a user.

11 Claims, 6 Drawing Sheets

D CHANNEL MONITOR

BACKGROUND OF THE INVENTION

The present invention is directed to a monitoring arrangement for an ISDN (Integrated Services Digital Network) terminal, and, more particularly, to a D channel monitor for such an ISDN terminal.

ISDN is presently being promoted by telephone companies in an effort to improve quality, capacity, and variety of services. Preliminary ISDN specifications have been introduced by CCITT, the international communications standards committee. In the U.S. and Canada, subsets and minor variations of these standards are being defined by the major central office equipment vendors, such as AT&T and Northern Telecom.

The technical concept of ISDN is being accomplished by using the existing copper telephone lines to carry a digital signal instead of the usual analog voice (limited to 3000 Hz). The digital signal is transmitted at a rate of 160,000 bits per second (bps), offering two 64,000 bps channels (known as "B" channels) for voice or data calls, and one 16,000 bps channel (identified as the "D" channel) for establishing and maintaining the call connection to the network (and also used for sending data packets using the X.25 protocol) as a basic service. Implementation of ISDN requires new central office switching and transmission equipment, and sometimes dramatically different terminal equipment (e.g., telephones, modems, data terminals) at the user or subscriber end of the telephone line. At present, ISDN is starting limited technical field trials in several cities around the U.S., and is already being widely implemented in Europe.

Technicians and installers of ISDN circuits often need to identify the source of trouble in the event of problems in making or answering a voice or data call. As noted above, in basic ISDN service, the voice or data information is carried by one of two B channels on the ISDN circuit. The call transactions to make a connection, or link, are established via the D channel. Messages sent to and from the central office on the D channel contain the information defining the status of the link. It is very important to know what part of the link activity is failing to determine if the trouble is in the local equipment or elsewhere. All D channel information may be displayed in the following formats:
1. Binary.
2. Hex.
3. Bus activation state.
4. OSI layer 1 HDLC frames.
5. OSI layer 2 LAPD/LAPD decoder frames.
6. OSI layer 3 Q.931 and decoder X.25 frames.

The present invention is directed to a D channel monitor to permit simulation and monitoring in a variety of modes to help isolate the location of any problems quickly and accurately.

FIG. 1 shows a basic ISDN terminal which the present invention can be used in conjunction with. The terminal is divided into functional groupings. By separating functions conceptually in this way, it is possible to identify and specify the interfaces between them. A description of the functional groups is as follows, noting that this description is confined to the functions of basic access.

NT1—Network Termination 1. This is the group of functions which terminate the transmission line. As such, it is seen in the CCITT recommendations as belonging to the network provided, i.e., the owner of the transmission line. The functions of the NT1 are described as:
Line transmission termination.
Line maintenance and performance monitoring. Timing.
Power transfer, extracting power from the line to drive at least the "wake-up" portion of the terminal.
Parts of the multiplexing functions.
Termination of the T interface which may include multi-drop termination and associated contention resolution functions.

NT2—Network Termination 2. This is the group of functions which give the terminal its particular "character". An NT2 could be a PABX if access is primary, a LAN or a terminal controller. The functions of the NT2 are described as:
Protocol handling or handling that part of the protocol associated with information transfer across a network.
The higher-level parts of the multiplexing function.
Switching and concentration functions.
Maintenance functions.
Interface functions to the S and T interfaces.

The NT2 functional group may be more or less complex depending on the application. The range extends from the quite complex function of a PABX down to relatively simple functions required for a time division multiplexer. In specific simple cases all the functions may be adequately performed by NT1, and NT2 becomes merely physical connections.

TE—Terminal Equipment. This is the device itself. It could be a digital telephone, a CADCAM workstation, a computer terminal, etc.

TE1—Terminal Equipment Type 1. Such terminal equipment complies with ISDN user-network interface recommendations and therefore supports interface S.

TE2—Terminal Equipment Type 2. Such a terminal supports the same functions but does not comply with the ISDN user-network interface recommendations. It must therefore interface with the ISDN access via a TA Terminal Adapter which converts the non-ISDN interface functions into ISDN acceptable form at reference points S or T.

This description has largely revealed the nature of the interfaces. A further description is as follows:

Reference point T (T for Terminal) Separates the network provider's equipment from the user equipment. Provides a standardized interface between equipment, sending and receiving, validating and timing information to the network and to terminal equipment devoted to the use of this information.

Reference point S (S for System) Separates the user terminal equipment from the network functions of the terminal.

Reference point R (R for Rate) Provides a non-ISDN interface between non-ISDN compatible user equipment and adapter equipment. Such an interface may well comply with one of the CCITT X series interface recommendations.

Reference point U (U for User) Interface between NT1 and the transmission line.

The terminology from FIG. 1 will be used throughout the rest of the specification. This terminology is presently well accepted standard terminology, as discussed, for example, in the textbook, "The Integrated Services Digital Network: from Concept to Application", by John Ronayne, published by John Wile & Sons, Inc., 1988, which is hereby incorporated by reference. It is to be noted that throughout the specification, the term "TE" (terminal equipment) will be used to generically identify both the use of ISDN compatible equipment TE1 and ISDN non-compatible equipment TE2 together with a commercially available terminal adapter (TA).

OBJECTS OF THE INVENTION

It is an object of the present invention to provide a D channel monitor at the S or T interface of an ISDN customer access terminal.

It is a further object of the present invention to provide a D channel monitoring arrangement that can be operated in a plurality of modes to simulate different elements of the ISDN customer access terminal and/or to monitor D channel operation between elements of the customer access terminal equipment.

SUMMARY OF THE INVENTION

To accomplish these and other objects, the present invention provides a D channel monitor which is capable of providing a plurality of operating modes for monitoring D channel operation. As such, the D channel monitor can include first and second interface elements which can be operated to appear as either an NT interface (for a TE) or as a TE interface (for an NT). A controller is provided which can control the first and second interface elements to appear a predetermined ones of the NT interface or the TE interface for respectively coupling to either a TE or an NT of the ISDN user terminal. A monitoring arrangement is also included for monitoring the D channel signals at the terminal which are received through either of the first and second interface elements. This monitoring arrangement includes means for indicating the status of the D channel signals to a user.

BRIEF DESCRIPTION OF THE DRAWINGS

FIG. 1 shows a block diagram of a basic ISDN terminal which the present invention can be used in conjunction with;

DETAILED DESCRIPTION

Figure 1:
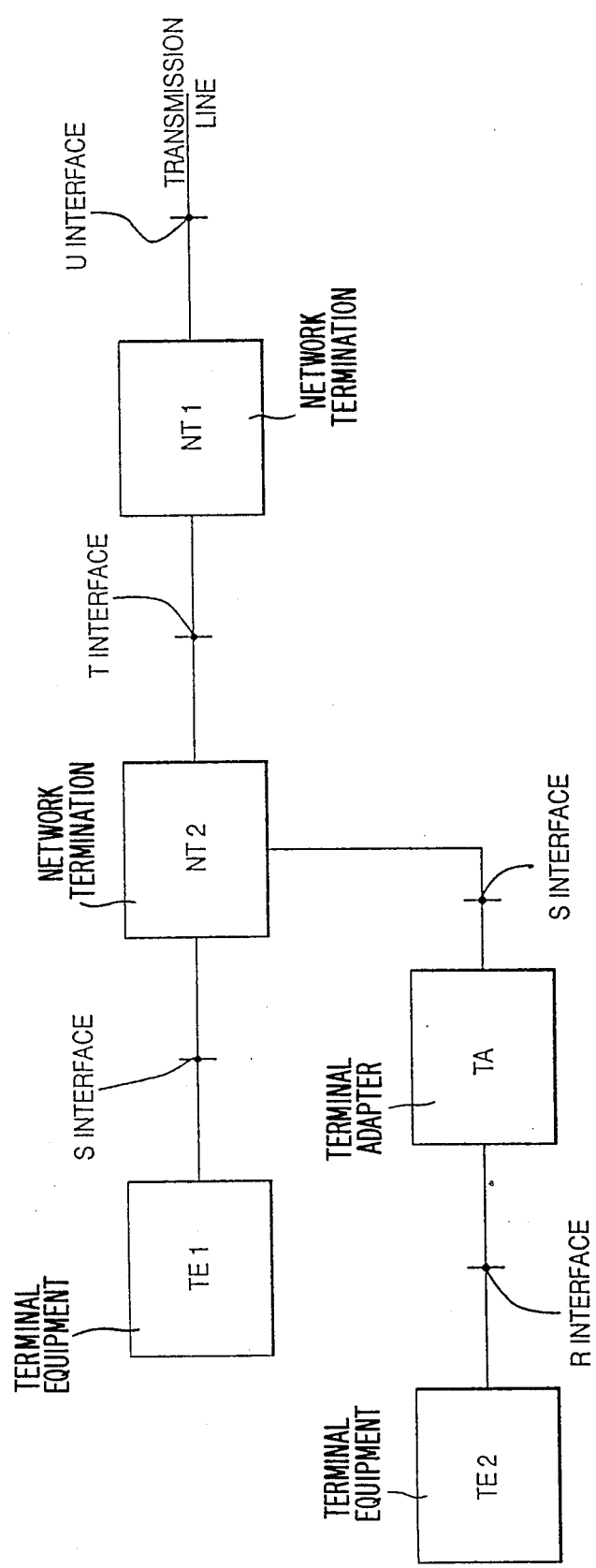
Figure 2:
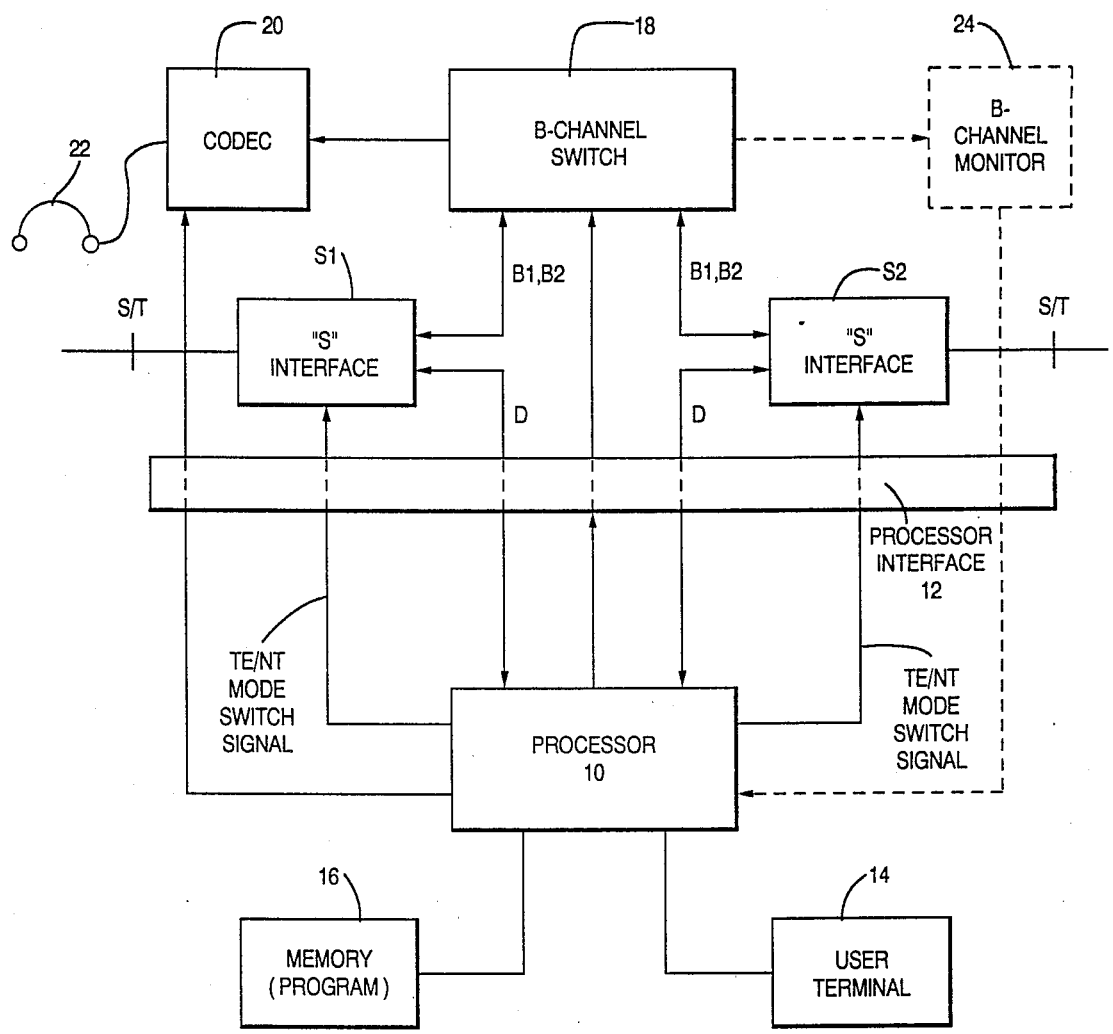
FIG. 2 shows a block diagram of an embodiment of a D channel monitor in accordance with the present invention.

FIG. 2 is a block diagram of an embodiment of the D channel monitor of the present invention. As shown there, the monitor includes first and second S interface elements S1 and S2 which permit coupling to either TEs or NTs in an ISDN terminal (noting that throughout the description the term "NT" is meant to be a generic term to include both NT1 and NT2 equipment discussed with regard to FIG. 1). These S interface elements S1 and S2 are commercially available elements such as the S interface 29C53 by Intel. Such S interfaces are customarily designed to be capable of either serving as a TE interface for an NT or as an NT interface for a TE of an ISDN terminal. As is well known, the transmitters of a TE provide slightly different signals than the signals on the transmit lines of an NT to avoid the possibility of collisions when a single NT services multiple TEs. Therefore, in order to provide the S interface components with the ability to interface with NTs and TEs, commercially available S interface components include appropriate elements to permit them to be switched to serve as either a TE interface or an NT interface.

In order to control whether the S interfaces S1 and S2 appear as a TE interface (for an NT) or an NT interface (for a TE), control signals are provided from a processor 10 to the S interface elements S1 and S2 through a processor interface 12. Although the invention is not necessarily limited thereto, the processor 10 can be a microprocessor such as the Toshiba T1100 lap-top computer. The processor 10 is either coupled to a user terminal 14 for providing a screen display or, as in the case of the Toshiba T1100, the processor 10 directly includes the necessary user terminal 14.

In addition to providing control signals for determining whether the S interface elements S1 and S2 are in the NT mode or the TE mode, the processor 10 also receives D channel signals from the S interface elements S1 and S2 through the processor interface 12. Alternatively, as will be discussed later with regard to simulation modes of the D channel monitor, the processor 10 can also provide simulated D channel signals to the S interfaces S1 and S2 for combination with B channel signals to form a simulated ISDN output for testing of elements in the ISDN terminal. This dual D channel capability of the processor 10 is indicated by the two-headed arrows between the processor 10 and the S interface elements S1 and S2.

Control of the processor 10 is in accordance with programs stored in the memory 16. This control will be discussed later with regard to FIG. 9 concerning the software architecture for the system.

The S interface elements S1 and S2, of course, also serve to pass B channel information. This B channel information is passed through a path (referred to here simply as a B channel switch 18) unchanged (noting that the D channel information is either being monitored or changed, as will be discussed later). The B channel information is passed to a Codec 20 (e.g., an Intel 29C48, or other appropriate commercially available Codec equipment). From the Codec 20, the B channels are provided to a telephone handset 22 to allow voice communication through the D channel monitor. Alternatively, the B channel information can also be passed, if desired, to a B channel monitor (e.g., utilizing an Intel 82520HSCC, for example) for providing monitoring of B channels as well.

The above-described embodiment shown in FIG. 2 serves as a basic structure to permit a wide variety of simulating and monitoring operations for the D channel signals. A major feature of the present invention is its versatility in allowing a user a wide variety of operating modes for studying the D channel operation of an ISDN terminal. This variety of operating modes can permit the user to readily establish the location of a problem which might be occurring in the ISDN terminal. To provide a better idea of this, FIGS. 3 through 7 will now be discussed to illustrate several possible operating modes which are available for the embodiment of FIG. 2.

Figure 3:
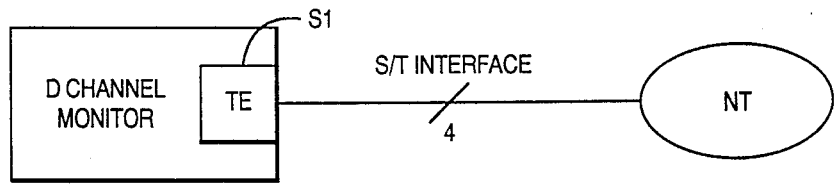
FIGS. 3 through 7 are block diagrams showing different modes of operation for connecting the D channel monitor of FIG. 2 to permit monitoring of the D channel signal in an ISDN terminal under different circumstances.

FIG. 3 shows a first mode wherein the D channel monitor operates as a TE simulator. In order to do this, one of the S interface elements (e.g., S1) is controlled to be in a TE mode to appear as a TE to the ISDN terminal NT. The other S interface element (e.g., S2) is not used. In this first mode, the processor 10 operates to provide D channel signals to the NT through the processor interface 12 and the interface S1. B channel signals can also be provided by simulation in the processor or by providing voice through the handset. The D channel monitor can then study the D channel signals returned through the S1 interface from the NT. In effect, mode 1 is a one-way monitoring of D channel information from the NT which can isolate on whether problems exist in the NT portion of the ISDN terminal.

Figure 4:
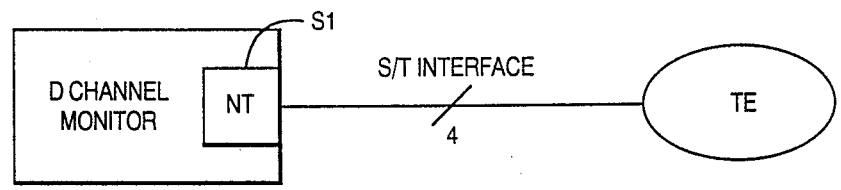

FIG. 4 shows a second mode wherein the D channel monitor operates as an NT simulator. In this case, one of the S interface elements (e.g. S1) is operated to appear as an NT interface for the TE of the ISDN terminal. The processor 10 provides the D channel information to the TE through this NT interface. Again, the other S interface element (e.g., S2) does not need to be used in this mode. The processor also receives the D channel information from the TE (through the NT interface S1 and the processor interface 12) and studies this D channel information. In this way, the D channel monitor can isolate testing to the TE of the ISDN terminal to determine if it is the source of a problem. As in FIG. 3, the second mode shown in FIG. 4 is essentially a one-way monitoring arrangement.

Figure 5A:
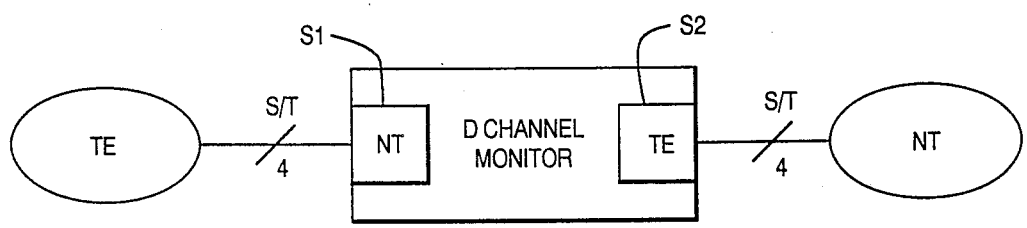

FIG. 5A illustrates a mode which permits two-way monitoring of D channel information between the TE and the NT of an ISDN terminal. In this mode, both the S interface elements S1 and S2 are used. Specifically, S1 is controlled by the processor 10 to appear as an NT interface for the TE of the terminal. Interface S2 is controlled by the processor 10 to appear as a TE interface for the NT of the terminal.

In the arrangement of FIG. 5A, the D channel monitor can effectively be transparent to simply analyze the two-way flow of information between the TE and the NT of the terminal. This two-way monitoring can be used to quickly check; both the TE and the NT of the terminal.

However, in addition to simple two-way monitoring, the embodiment of FIG. 5A has another important feature. Specifically, each of the S interface elements S1 and S2 are independent terminations for the TE and the NT of the terminal, modifications of the D channel information can be carried out in the D channel monitor to arrange different test scenarios. A wide variation of changes to the D channel information are possible using the processor 10 for studying how the TE and NT will react when the situation is changed. For example, additional D channel signals can be added. On the other hand, D channel signals can be deleted or modified for whatever purposes the tester might desire.

Figure 5B:
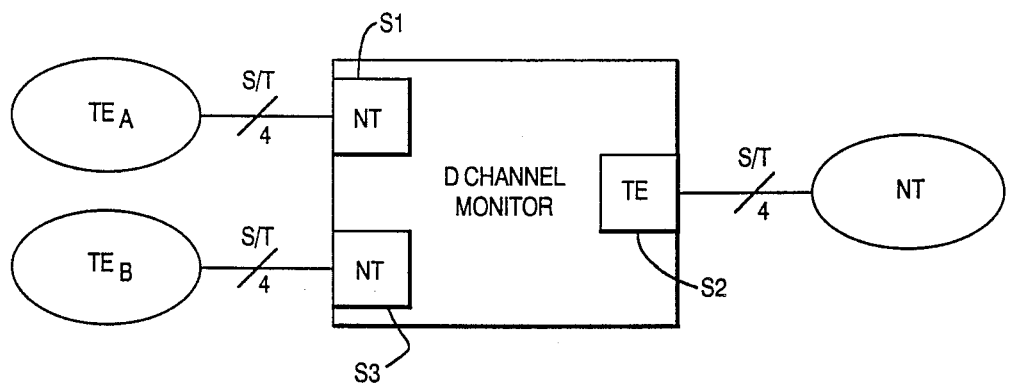

It should be noted at this point that although the figures discussed so far illustrate only two interface elements for the D channel monitor, a larger number can be provided. FIG. 5B shows an example of this which is essentially a variation of FIG. 5A. In FIG. 5B, three S interface elements S1, S2 and S3 are used in the D channel monitor to permit monitoring of D channel information flow between two different TEs and an NT. $TE_A$ is a telephone generating relatively low amounts of D channel traffic. $TE_B$, on the other hand, is a data terminal generating high volume D channel traffic. In order to permit D channel monitoring in this situation, a third S interface S3 is provided to couple to $TE_B$. In the manner previously discussed, S1 is controlled by the processor 10 to appear as an NT interface, S2 is controlled to appear as a TE interface and S3 is controlled to appear as an NT interface for $TE_B$.

During the D channel monitoring, if desired by the user, the processor 10 can operate to modify traffic flow on the D channels between the two TEs and the NT in FIG. 5B. For example, if the high volume of D channel traffic from $TE_B$ appears to be adversely effecting the operation of $TE_A$, the D channel monitor can temporarily block some or all of the D channel information of $TE_B$ from reaching NT while still permitting full communication between $TE_A$ and NT. In effect, then, $TE_B$ will be communicating only with the D channel processor (which could be simulating the NT as in mode 2), while $TE_A$ is communicating through the D channel processor with the actual NT of the ISDN terminal. This permits isolation on selected elements of the terminal for location of the source of any problems.

Figure 6:
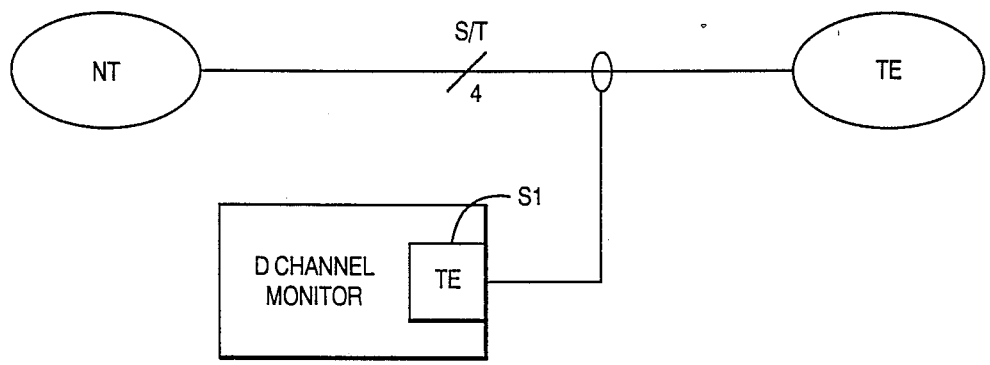

FIG. 6 shows a fourth mode which is essentially a simplified version of the third mode. Here, a simple non-terminating wiring connection is used to couple the D channel monitor to the S/T interface between the TE and NT of the terminal. One of the S interface elements of the D channel monitor (e.g., S1) is then placed in a TE mode to appear to the terminal NT as simply another TE. No D channel signals are provided from the processor to the lines. Instead, the processor 10 simply passively monitors the D channel information which it receives through the interface S1.

Figure 7:
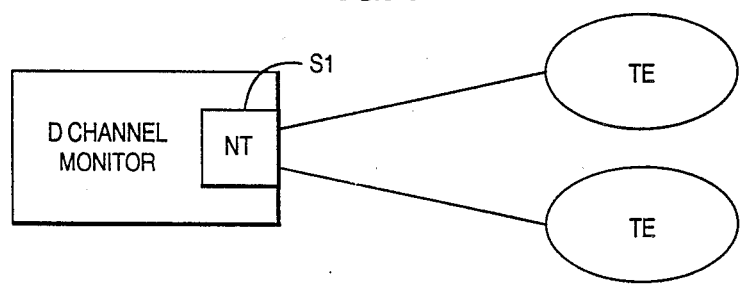

FIG. 7 shows a variation of FIG. 4 where the D channel monitor can simulate an NT for a pair of TEs. In this fifth mode, only one of the S interface elements (e.g., S1) needs to be used to appear as a TE interface. D channel information is simulated by the processor 10 to be provided to both TEs. Then, the processor 10 can analyze the returning D channel information from the TEs to monitor the respective D channel outputs of these two TEs.

Figure 8:
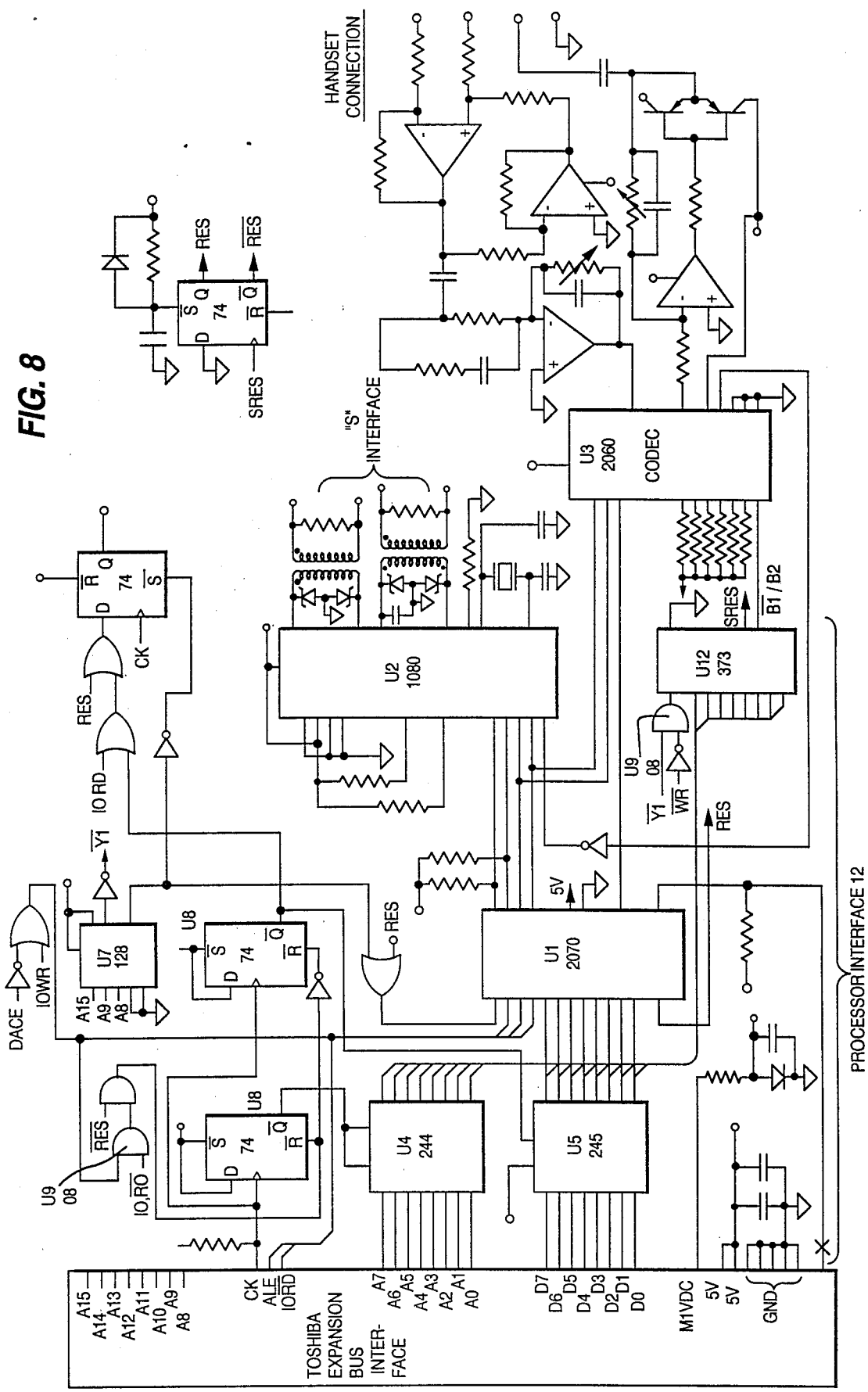
FIG. 8 is a circuit diagram of a possible circuit implementation of the D channel monitor of FIG. 2.

FIG. 8 shows a detailed example of a schematic of a portion of the D channel monitor. In this figure, the D channel monitor is formed as an expansion board for coupling to a Toshiba T1100 microprocessor, as mentioned earlier. The figure shows the location of commercially available ICs and appropriate gate and amplifier circuitry for the processor interface, the S interface, the Codec and the handset connection in conjunction with the Toshiba T1100 microprocessor. This figure is provided merely as one example of a circuit arrangement that could be used with the particular Toshiba T1100 computer to actually implement the embodiment of FIG. 2.

Figure 9:
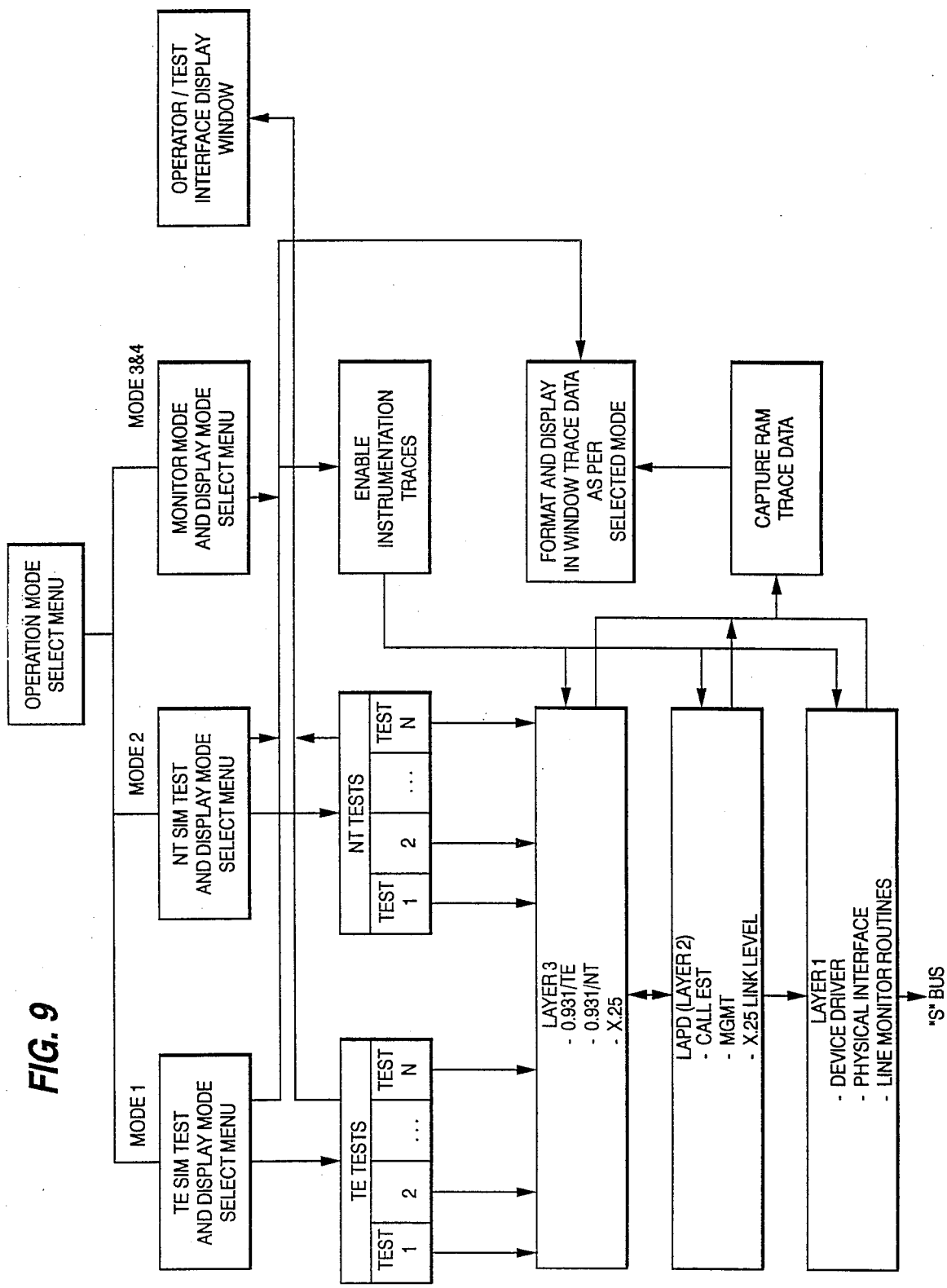
FIG. 9 shows an example of test system software architecture which can be used for carrying out the simulated and monitoring operations of the D channel monitor of the present invention.

FIG. 9 illustrates an example of test system architecture which can be used in conjunction with the embodiment of FIG. 2 in implementing modes 1 through 4 discussed previously (e.g., FIGS. 3 through 6). As noted previouslY, FIG. 7 represents a simple modification of mode 2 which could readily be implemented in this software architecture.

As can be seen from FIG. 9, the different modes of operation in conjunction with the first three layers of the well-known OSI (open system interconnection) are provided for displaying information to the user concerning the D channel operation. The architecture begins with an operator mode selection menu to select the basic mode of operation of the test unit. The appropriate test software is then loaded from the selections on these menus. The TA Simulator/NT Simulator/Monitor Mode Select Menu provide the next level of operator menu selection, where the specific test drive is selected and loaded, and the display type and format are selected. This information is then passed to the enable trace function and trace format and display function. In the embodiment shown in FIG. 9, two windows are on the PC screen of the user terminal 14 of FIG. 2, one for the operator control of the test and one displaying the monitor functions.

The Enable Instrumentation Traces of FIG. 9 enable the selected trace instrumentation software in layers 1, 2 and 3. The Capture Raw Trace Data function captures and buffers all raw trace and monitoring data that has been enabled from layers 1, 2 and 3. Regarding the layers, layer 3 can be the Q.931 and X.25 layer 3 with instrumentation software for extracting trace data. Layer 2 can be the Q.921 with instrumentation software for extracting trace data. Layer 1 can be layer 1 device drivers with instrumentation software for extracting trace data. Layer 1 is also supplemented with a driver to perform the line monitoring function.

The test drivers of FIG. 9 are a set of specific tests that are selected by the operator in TE/NT simulation modes 1 and 2. These "tests" drive the existing layer 3 functions. Some examples of tests that ca be performed with the software architecture of FIG. 9 in connection with modes 1 to 4 are:
1. Voice Call Establish TE side
2. Voice Call Establish NT side
3. Voice Call Terminate NT side
4. Voice Call Terminate TE side
5. X.25 Data Call Establish NT side
6. X.25 Data Call Establish TE side
7. X.25 Data Call Terminate NT side
8. X.25 Data Call Terminate TE side
9. Overlapped Voice/Data Calls
10. Check Line Status In conjunction with FIG. 9, the attached Appendix provides functional and operational software specifications for the D channel monitor of the present invention. These software specifications can be used to carry out the software architecture shown in FIG. 9 to permit the embodiment of FIG. 2 to implement the modes shown in FIGS. 3 through 7. Of course the present invention is not intended to be limited to these particular software specifications (or the particular software architecture of FIG. 9 for that matter) since obviously modifications of this are possible which would fall within the scope of the present invention.

As noted above with regard to FIG. 9, it is envisioned that two display windows can be provided at the user terminal 14 (i.e., one for the operator to control testing and one for displaying the monitoring functions). Of course, additional display windows could be provided, if desired. In any event, it is noted that in accordance with another optional aspect of the present invention, the D channel monitor can actually provide suggestions to the user on the display screen for where the source of a problem may be found. It has been mentioned previously that the present invention permits connection of the D channel monitor in a variety of modes to permit isolation on respective elements of the ISDN terminal.

With this mind, the programming of the processor can be such as to carry out an analysis of the D channel information to create suggestions of the most likely source of the problem.

A classic example of a problem on an ISDN line that this invention would be particularly adapted to solving is where two terminals are programmed by some means on the same address. Typically, messages on an S interface are differentiated by an address field. On some devices the address field that relates to a particular TE is set by dip switches on the back of the unit. If inadvertently someone has set those dip switches to provide the same address on two different TEs, there is no way then they can distinguish between messages for each other. That is a common problem. It ultimately results in the central office switch bringing the line down and then trying to reestablish communication again. This situation could be pinpointed by the present invention by monitoring messages coming in either from the central office switch or from the terminals. If a particular message comes in from the central office switch, it solicits a response. If each of the terminals on the line are programmed for the same address, then each of them will receive that message and regard it as being for them. And they will both respond. What the D channel monitor will see is a single incoming message for a certain address and two responses at the same address. The processor 10 can then conclude that there must be two terminals each with the same address assignment. Therefore, the processor 10 will simply put a message on the screen "Check terminal address assignments", as a suggestion for the user to resolve the problem.

It is noted that the present invention can be used in conjunction with the system disclosed in U.S. patent application Ser. No. 192,175, filed on even date herewith by the same inventors as the present application, entitled "ISDN Traffic Generator Adapter", which is herein incorporated by reference.

It is to be understood that the above-described arrangements are simply illustrative of the application of the principles of this invention. Numerous other arrangements may be readily devised by those skilled in the art which embody the principles of the invention and fall within its spirit and scope.

APPENDIX

Software Specification

ISDN System and Protocols
D-Channel Monitor/Protocol Analyzer
1. GENERAL
   1.1 This document contains functional and operational specifications of software which provides the ISDN D-Channel Monitor subfunction of control programs for all types of Harris/Dracon ISDN Terminal Adapters and Portable ISDN Protocol Analyzer Systems.
2. FUNCTIONAL SPECIFICATIONS
   2.1 The ISDN D-Channel Monitor provides to the user detailed and summary information concerning events within the occuring on the ISDN S/T interface.
   2.2 Displays for 4 data link connections are provided. Dlcn=0 corresponds to the broadcast data link for the management entity. Dlcn=1 and Dlcn=2 correspond to the two point-to-point signalling data links. Dlcn=3 is currently undefined.
   2.3 S/T TRACE

2.3.1 The general format of the Trace display follows.

ENTITY (DLCN):TIME S=STATE MESSAGE

2.3.2 The Entity field indicates the layer and or service within the layer generating the message. Entity names and descriptions follow.

| | |
|---|---|
| PHYS | Physical Layer |
| LAPD | Data Link Layer, LAPD Protocol |
| MGMT | Data Link Layer, Link Management Entity |
| Q931 | Network Layer, Q.931 Signalling Protocol |
| X.25 | Network Layer, X.25 Signalling Protocol |
| ABST | Terminal Layer for Q.931 Abstract Terminal. |
| XPAD | Terminal Layer for X.25 PAD. |

2.3.3 The Dlcn field is a single digit identifying the data link generating the message.
2.3.4 The Time field shows the elapsed time (mS) since the last message display.
2.3.5 The State field contains the internal state number of the layer generating the message.
2.3.6 The Message field may indicate a Primitive transaction in the following format.

| | |
|---|---|
| DIR | '>>' for received primitives. |
| | '<<' for transmitted primitives. |
| NAME | Primitive name. |

2.3.7 The Message field may contain a Frame display with the following fields.

| | |
|---|---|
| NAME | LAPD Frame Type. |
| DIR | '>>' for outgoing frame. '<<' for incoming frame. |
| CR=n | Command/Response bit. |
| P/F=n | Poll/Final bit. |
| NR=n | Receive Sequence Number. |
| NS/R=n/n | Send and Receive Sequence Numbers. |
| C=n | Number of Frame Pointer Copies. (Implementation detail.) |
| P=n | Address of Frame in Memory. (Implementation detail.) |

2.3.8 The Message field may contain text indicating a layer state change, S-interface or R-interface device event, or other implementation event.
2.4 The format of the LAPD Summary follows.

| | |
|---|---|
| SAPI | Service Access Point Identifier. |
| TEI | Terminal Endpoint Identifier. |
| STATE | LAPD internal state number. |
| V(S) | Send Sequence Variable. |
| V(A) | Acknowledge Sequence Variable. |
| V(R) | Receive Sequence Variable. |
| LAPD INPUT WAITING | Incoming frames in L1/L2 queue. |
| LAPD OUTPUT WAITING | Outgoing frames in L1/L2 queue. |
| INFO INPUT WAITING | Incoming frames in L2/L3 queue. |
| INFO OUTPUT WAITING | Outgoing frames in L2/L3 queue. |
| INFO OUTPUT PENDING | Outgoing frames awaiting acknowledge. |
| TOTAL TRANSMITTED | Outgoing frames thru L1/L2 queue. |
| TOTAL RECEIVED | Incoming frames thru L1/L2 queue. |
| OWN RECEIVER READY | Flag is TRUE or FALSE. |
| PEER RECEIVER READY | Flag is TRUE or FALSE. |
| REJECT EXCEPTION | Flag is TRUE or FALSE. |
| ACKNOWLEDGE PENDING | Flag is TRUE or FALSE. |
| FREE FRAMES | Number of unused frame buffers. |
| PHYS INPUT WAITING | Incoming frames in ICC/L1 queue. |

3. OPERATIONAL SPECIFICATIONS
3.1 The default program mode is Command Mode. The following commands are available from this mode.

| | |
|---|---|
| QUIT | Return to AT MODEM EMULATION. |
| USET n b p d s | Set UART-1 or UART-2 operating parameters. |
| ECHO | Start/stop local echo on UART-3. |
| LF | Start/stop line feed strip on UART-3. |
| TASK | Multitasker system status. |
| IO | IO system status. |
| UART | UART device status. |
| PORT | Parallel port device status. |
| TBB r b m | Perform 'nailed-up' t-link building block test (available only for HTA-1 and HTA-2) using r-interface <r> b-channel <b>, and <A>nswer or <O>riginate mode. Type ctrl-z to exit data state and return to monitor command level. |
| M seg addr | Examine/modify memory byte. |
| MW seg addr | Examine/modify memory word. |
| P addr [NR] | Examine/modify port byte. |
| PW addr | Examine/modify port word. |
| D seg addr n | Dump n memory bytes. |
| DW seg addr n | Dump n/2 memory words. |
| (The symbols CS:, DS:, and ES: may be used for seg arguments to access the 81088 code, data, and extra segments) | |
| TRACE | Enter TA trace/simulation mode. |
| NT | Enter NT trace/simulation mode (NT simulator only). |

3.3 The Trace mode is entered by command, and allows detailed examination and stimulus of the S/T interface. The following commands are available while in this mode.

| | |
|---|---|
| ESC | Return to monitor command level. |
| INS | Select Data Link Connection Number 0. |
| END | Select Data Link Connection Number 1. |
| DOWN | Select Data Link Connection Number 2. |
| PGDN | Select Data Link Connection Number 3. |
| F1 | Set PH-ACTIVATE-REQUEST. |
| F2 | Set MPH-DEACTIVATE-REQUEST. |
| F3 | Set DL-ESTABLISH-REQUEST. |
| F4 | Set DL-RELEASE-REQUEST. |
| F5 | Set DL-SET-RCVR-BUSY-REQUEST. |
| F6 | Set DL-CLEAR-RCVR-BUSY-REQUEST. |
| F7 | Set DL-OK-TO-ESTABLISH. |
| F8 | Clear DL-OK-TO-ESTABLISH. |
| F9 | Set DL-REJ-EXCEPTION. |
| F10 | Clear DL-REJ-EXCEPTION. |
| CTRL-F1 | Set LAPD state to 1 - TEI UNASSIGNED. |
| CTRL-F2 | Set LAPD state to 2 - ASSIGN AWAITING TEI. |
| CTRL-F3 | Set LAPD state to 3 - ESTABLISH AWAITING TEI. |
| CTRL-F4 | Set LAPD state to 4 - TEI ASSIGNED. |
| CTRL-F5 | Set LAPD state to 5 - AWAITING ESTABLISHMENT. |
| CTRL-F6 | Set LAPD state to 6 - AWAITING RELEASE. |
| CTRL-F7 | Set LAPD state to 7 - MULTIPLE FRAME ESTABLISHED. |
| CTRL-F8 | Set LAPD state to 8 - TIMER RECOVERY. |
| CTRL-F9 | Invoke Remote TEI check (NT only). |

-continued

| | |
|---|---|
| CTRL-F10 | Invoke Remote TEI removal (NT only). |
| ALT-F1 | Display physical layer messages. |
| ALT-F2 | Suppress physical layer messages. |
| ALT-F3 | Display data link layer messages. |
| ALT-F4 | Suppress data link layer messages. |
| ALT-F5 | Display network layer messages. |
| ALT-F6 | Suppress network layer messages. |
| ALT-F7 | Display abstract terminal layer messages. |
| ALT-F8 | Suppress abstract terminal layer messages. |
| ALT-F9 | Display LAPD status summary. |
| ALT-F10 | Display MDL ERROR log. |
| SHIFT-F1 | Transmit SIG = ALERTING-1. |
| SHIFT-F2 | Transmit SIG = ALERTING-2. |
| SHIFT-F3 | Transmit SIG = ALERTING-3. |
| SHIFT-F4 | Transmit SIG = ALERTING-OFF. |
| SHIFT-F5 | Transmit BCC = RELEASE-B1. |
| SHIFT-F6 | Transmit BCC = RELEASE-B2. |
| SHIFT-F7 | Transmit BCC = CONNECT-B1. |
| SHIFT-F8 | Transmit BCC = CONNECT-B2. |
| SHIFT-F9 | |
| SHIFT-F10 | Transmit INIT. |
| ALT-1 | Transmit Activator 1/Indicator 1 (pattern 0). |
| ALT-2 | Transmit Activator 2/Indicator 2 (pattern 1). |
| ALT-3 | Transmit Activator 3/Indicator 3 (pattern 2). |
| ALT-4 | Transmit Activator 4/Indicator 4 (pattern 3). |
| ALT-5 | Transmit Activator 5/Indicator 5 (pattern 4). |
| ALT-6 | Transmit Activator 6/Indicator 6 (pattern 16). |
| ALT-7 | Transmit Activator 7/Indicator 7 (pattern 17). |
| ALT-8 | Transmit Activator 8/Indicator 8 (pattern 18). |
| ALT-9 | Transmit Activator 9/Indicator 9 (pattern 19). |
| ALT-0 | Transmit Activator 10/Indicator 10 |
| ALT- | Transmit Activator 11/Indicator 11 |
| ALT-= | Transmit Activator 12/Indicator 12. |
| ALT-W | Transmit PI = E-E NOT ISDN DAD NOT ISDN |
| ALT-E | Transmit PI = OAD NOT ISDN |
| ALT-T | Transmit PI = RETURNED TO ISDN, TREATMENT |
| ALT-Y | Transmit PI = PROCEEDING |
| ALT-U | Transmit PI = ALERTING |
| ALT-I | Transmit PI = CONNECTED |
| ALT-O | Transmit PI = DIALING |
| ALT-P | Transmit PI = DISCONNECT |
| ALT-A | Transmit SIG = DIAL-TONE. |
| ALT-S | Transmit SIG = RING-TONE. |
| ALT-D | Transmit SIG = REORDER-TONE. |
| ALT-F | Transmit SIG = BUSY-TONE. |
| ALT-G | Transmit SIG = CONFIRMATION-TONE. |
| ALT-H | Transmit SIG = CUSTOM-TONE. |
| ALT-J | Transmit SIG = SPECIAL-DIAL-TONE. |
| ALT-K | Transmit SIG = EXPENSIVE-ROUTE-TONE. |
| ALT-L | Transmit SIG = TONE-OFF. |
| ALT-Z | Transmit CAD = "CAD TEST" |
| ALT-X | Transmit DSP = "DSP TEST" |
| ALT-C | Transmit OAD = "OAD TEST" |
| ALT-V | Transmit DAD = "DAD TEST" |
| ALT-B | Transmit RAD = "RAD TEST" |
| ALT-N | Start Continuous KEY = '*' Transmission. |
| ALT-M | Stop Continuous KEY = '*' Transmission. |
| Any Text | Transmit = 'key' |

What is claimed is:

1. A D channel monitor for use with an ISDN terminal comprising:
first and second interface elements including means to permit each of the interface elements to appear selectively as one of a network termination interface and a terminal equipment interface;
a controller coupled to said first and second interface elements, wherein said controller includes means for controlling said first and second interface elements to appear selectively as predetermined ones of said network termination interface and said terminal equipment interface to respectively couple to a selected one of terminal equipment and a network termination of said ISDN terminal; and
means for monitoring D channel signals in said ISDN network received through a selected one of said first and second interface elements for allowing examination of the content of messages passing along the D channel,
wherein said first and second interface elements are S interface elements.

2. A D channel monitor for use with an ISDN terminal comprising:
first and second interface elements including means to permit each of the interface elements to appear selectively as one of a network termination interface and a terminal equipment interface;
a controller coupled to said first and second interface elements, wherein said controller includes means for controlling said first and second interface elements to appear selectively as predetermined ones of said network termination interface and said terminal equipment interface to respectively couple to a selected one of terminal equipment and a network termination of said ISDN terminal; and
means for monitoring D channel signals in said ISDN network received through a selected one of said first and second interface elements for allowing examination of the content of messages passing along the D channel,
wherein said controller and said monitoring means are part of a processor, wherein said D channel monitor includes means for generating B channel signals, wherein said first and second interface elements each include means for separating B channel information from D channel information to provide separate B channel and D channel outputs when said first and second interface elements are controlled by said controller to appear as a terminal equipment interface and when said first and second interface elements receive a combined ISDN signal having B channel information and D channel information from an ISDN network, and wherein said first and second interface elements further include means for combining B channel information and D channel information to form a combined ISDN signal to provide to said ISDN network when said first and second interface elements are controlled by said controller to appear as a network termination interface and when said first and second interface elements receive D channel signals generated by said processor and B channel information generated by said means for generating B channel signals.

3. A D channel monitor according to claim 2, wherein said processor includes means for providing simulated D channel messages to said network termination of said ISDN network and means for examining messages from the network termination back to said D channel monitor in response to said simulated D channel messages to study whether said network termination has a problem in providing accurate D channel messages to terminal equipment of the ISDN network, when said first interface element is controlled by said control means to appear as a terminal equipment interface.

4. A D channel monitor according to claim 2, wherein said processor includes means for providing simulated D channel messages to said terminal equipment of said ISDN network and means for studying D channel messages received by the D channel monitor from said terminal equipment in response to the simulated D channel messages to study whether said terminal equipment has a problem in providing accurate D channel messages to a network termination of the ISDN network, when the first interface element is controlled by said controller to appear as a network termination interface.

5. A D channel monitor according to claim 2, wherein said processor includes means for transparently allowing examination of the content of D channel messages passing between terminal equipment and a network termination of an ISDN network when said control means controls said first interface element to appear as a terminal equipment interface for the network termination of said ISDN network and controls said second interface element to appear as a network termination interface for said terminal equipment of said ISDN network.

6. A D channel monitor for use with an ISDN terminal comprising:
 first and second interface elements including means to permit each of the interface elements to appear selectively as one of a network termination interface and a terminal equipment interface;
 a controller coupled to said first and second interface elements, wherein said controller includes means for controlling said first and second interface elements to appear selectively as predetermined ones of said network termination interface and said terminal equipment interface to respectively couple to a selected one of terminal equipment and a network termination of said ISDN terminal; and
 means for monitoring D channel signals in said ISDN network received through a selected one of said first and second interface elements for allowing examination of the content of messages passing along the D channel,
 wherein said means for monitoring D channel signals includes means for displaying the D channel messages in a humanly readable form for examination.

7. A D channel monitor according to claim 5, wherein said means for monitoring D channel signals includes means for displaying the D channel messages in a humanly readable form for examination.

8. A D channel monitor according to claim 5, wherein said processor further includes means for varying the message content of the two-way flow of D channel messages between the network termination and the terminal equipment of the ISDN network to allow examination of how the variation affects the two-way flow of D channel messages.

9. A D channel monitor according to claim 2, wherein said D channel monitor further includes a third interface element coupled to said control means, said third interface element including means to permit said third interface element to appear as one of a network termination interface and a terminal equipment interface, in accordance with a control signal from said controller, and wherein said processor further includes means for transparently allowing examination of the content of D channel messages passing between two pieces of terminal equipment and a network termination of an ISDN network when said control means controls said first interface element to appear as a terminal equipment interface for said network termination of said ISDN network and controls said second and third interface elements to appear as network termination interface elements for said two pieces of terminal equipment of said ISDN network.

10. A D channel monitor according to claim 9, wherein said processor further includes means for varying the message content of the flow of D channel messages between said network termination and said two pieces of terminal equipment of said ISDN network to allow examination of how the variation affects the flow of said D channel messages.

11. A D channel monitor according to claim 10, wherein said processor further includes means for preventing the flow of D channel messages between one of said two pieces of terminal equipment and said network termination of said ISDN network to permit isolation on the communication between the other piece of terminal equipment and the network termination of said ISDN network.

* * * * *